(12) United States Patent
Hoffman

(10) Patent No.: US 6,437,338 B1
(45) Date of Patent: Aug. 20, 2002

(54) METHOD AND APPARATUS FOR SCANNING A DETECTOR ARRAY IN AN X-RAY IMAGING SYSTEM

(75) Inventor: David M. Hoffman, New Berlin, WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/407,350

(22) Filed: Sep. 29, 1999

(51) Int. Cl.[7] ............................................... H01J 40/14
(52) U.S. Cl. ............................ 250/370.09; 250/208.1
(58) Field of Search ..................... 250/370.09, 208.1; 257/443

(56) References Cited

U.S. PATENT DOCUMENTS

| | | | |
|---|---|---|---|
| 4,339,775 A | 7/1982 | Lemke et al. ................. 360/10 |
| 4,589,770 A | * 5/1986 | Jones et al. ..................... 356/1 |
| 4,996,413 A | 2/1991 | McDaniel et al. ........ 250/208.1 |
| 5,352,884 A | 10/1994 | Petrick et al. ............ 250/208.1 |
| 5,401,668 A | 3/1995 | Kwasnick et al. ............. 437/3 |
| 5,751,783 A | 5/1998 | Granfors et al. ............ 378/108 |
| 5,877,501 A | 3/1999 | Ivan et al. ............... 250/370.09 |
| 5,949,483 A | 9/1999 | Fossum et al. ............. 348/303 |
| 6,137,151 A | * 10/2000 | Street ......................... 257/443 |

FOREIGN PATENT DOCUMENTS

| | | |
|---|---|---|
| DE | 19524858 A1 | 1/1997 |
| GB | 2332585 A1 | 6/1999 |

* cited by examiner

*Primary Examiner*—Constantine Hannaher
*Assistant Examiner*—Otilia Gabor
(74) *Attorney, Agent, or Firm*—Quarles & Brady LLP

(57) ABSTRACT

An x-ray detector includes a two-dimensional array of detector elements that is segmented into regions. The detector elements in each region may be separately gated, or may be gated in blocks of elements to read out data onto a common data line to a region pre-amplifier. A scan sequencer operates the gate control lines to perform a scan in which the spatial resolution of the data read out from each region of the detector array may be separately selected to optimize the x-ray detector for particular clinical applications.

16 Claims, 4 Drawing Sheets

METHOD AND APPARATUS FOR SCANNING A DETECTOR ARRAY IN AN X-RAY IMAGING SYSTEM

BACKGROUND OF THE INVENTION

The field of the invention is x-ray imaging systems in which an image is produced by an array of detectors.

Conventional fluoroscopy systems include an x-ray source that projects an x-ray beam through a subject such as a medical patient. An image intensifier converts the x-rays into a visible light image and a video camera is used to produce an analog video signal for displaying the image on a monitor.

Recently, high resolution solid state x-ray detectors have been developed which include thousands of photo detector elements arranged in a two-dimensional array. Each detector element produces an electrical signal which corresponds to the brightness of a picture element in the x-ray image projected by the detector. The signal from each detector element is read out individually and digitized for further image processing, storage and display. Such systems are described for example in U.S. Pat. Nos. 4,996,413; 5,352,884 and 5,401,668.

As shown in FIG. 1, detector arrays are arranged in a two-dimensional array of detector elements comprised of vertical columns and horizontal rows. Each column of detector elements is connected to a single preamplifier and each row of detector elements is connected to a single control line from a row gate control circuit. The detector signals are scanned, one row at a time by sequentially enabling the row gate control lines.

As shown in FIG. 2, the result of this prior art scanning technique is that the detector signals are read out from detector regions that are equal in size and are shaped as a single horizontal line of detector elements. While this prior art technique simplifies construction of the detector array and associated circuitry, the line-shaped regions are very limiting and can have no relation to the subject matter being imaged.

Another characteristic of prior detector arrays is that they have a single, fixed image resolution. A separate signal is read from each detector element and the image resolution is, therefore, determined by the size and spacing of the detector elements. The number of rows and columns in a detector array is usually limited by economic considerations and, therefore, image resolution is usually determined by cost factors and the specified overall size of the detector array.

Another characteristic of prior detector arrays is that the detector elements are scanned at the same rate. That is, when the detector signals are scanned to refresh the displayed image, all the detector elements are scanned and their signals used to produce the next image frame. Since the detector elements accumulate charge proportional to the intensity of impinging x-rays, the detector elements in regions outside the patient will rapidly become saturated and detector elements in regions inside the patient will charge at slower rates dependent on the amount of x-ray attenuation. The x-ray dose and the time interval between scans of the detector array are set such that sufficient charge is accumulated in detectors located in regions of clinical interest. This is necessary to maintain the signal-to-noise ratio of the image at a clinically acceptable level. On the other hand, detector elements located outside the patient receive unattenuated x-rays and can become saturated, or overcharged. Since the rate at which the detector array is scanned may only be set to a single value, that value is usually dictated by the need to avoid saturation at all locations in the image.

SUMMARY OF THE INVENTION

The present invention is an improved x-ray detector having an array of detector elements which are segmented into regions, each region containing a plurality of detector elements arranged in a plurality of rows and a plurality of columns, and in which all the detector elements in a region are connected to a common data line and each detector element in a region is connected to a separate one of a plurality of control lines. A scan sequencer drives each of the control lines and may be operated to scan the x-ray detector in a variety of different ways. The detector array can be scanned to enable different scan rates in each region, to enable different resolutions in each region and to reduce the production of unnecessary data.

GENERAL DESCRIPTION OF THE INVENTION

Figure 1:
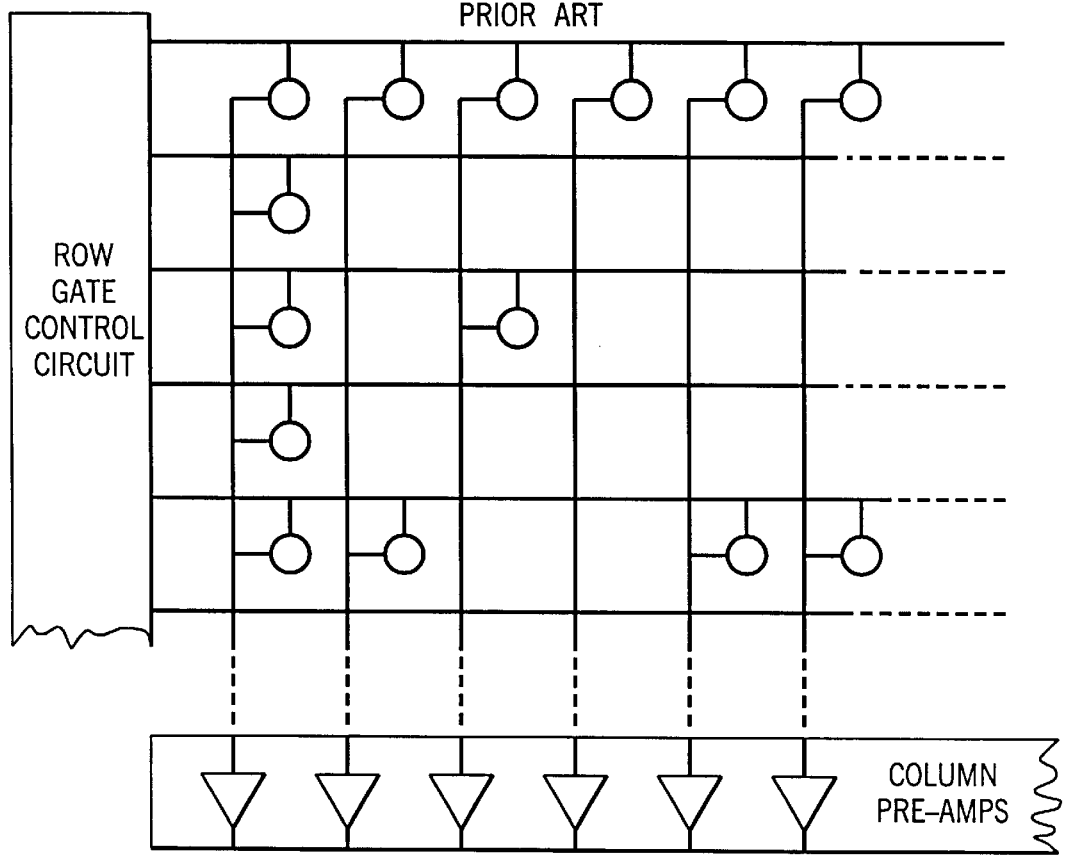
FIG. 1 is a schematic diagram of a typical prior art x-ray detector array.
Figure 2:
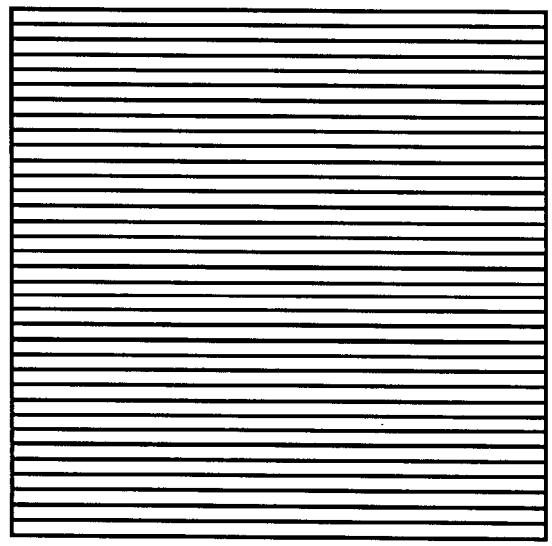
FIG. 2 is a pictorial representation of the line segments scanned by prior art x-ray detectors.

One aspect of the present invention is the recognition that prior art scanning methods in which one row at a time of the detector array is read out has no clinical relevance or benefit. All that can be said of the row-by-row scan is that the circuitry needed to perform such a scan is the least complicated. The present invention recognizes that by segmenting the detector array into regions comprised of subarrays of detector elements, a much more useful and versatile system can be provided. Such an x-ray detector is illustrated by way of example in FIG. 3, where a 36 by 36 element detector array 100 is segmented into 36 regions 102. Each region 102 is a 6 row by 6 column sub-array of 36 detector elements as illustrated at 104. All of the detector elements in each region 102 connect through a common data line 105 to one of 36 pre-amplifiers 106, and each of the 36 detector elements in a region 102 connect to separate ones of 36 control lines 108 driven by a scan sequencer 110. Each of the regions 102 is associated with one data line 105 and one pre-amplifier 106, whereas each of the 36 control lines 108 is associated with the same corresponding detector element in each of the 36 regions 102.

The detector array 100 can be scanned in a number of different ways. The particular scanning method used is determined by the operation of the scan sequencer 110. For example, the detector array 100 can be scanned in a high resolution mode in which the 36 control lines 108 are sequentially enabled by the sequencer 110. In this case, one detector element in each sub-array 104 is read out to the pre-amplifier 106 associated with the element's region 102. At the completion of the scan, one 36 by 36 pixel image may be produced.

The detector array 100 can also be scanned faster at lower spatial resolutions. For example, the scan sequencer 110 can drive four control lines at a time to read out four detector elements at the same time from each region 102. The control lines 108 are driven such that 4-element blocks of elements indicated by dashed line 112 are read out to each preamplifier 106. At the completion of such a scan, an 18 by 18 pixel image can be produced. Similarly, the scan sequencer 110 can be operated to read out a 9-element block of elements as indicated by dashed line 114. At the completion of such a scan, a 12 by 12 pixel image can be produced. It can be appreciated by those skilled in the art that detector arrays 100 have many more detector elements and many more regions than that illustrated in FIG. 3. The size is limited in this example solely for the purpose of more clearly illustrating the invention.

The present invention also enables the different regions 102 of the detector array 100 to be read out differently. For example, some of the regions 102 may be read out more often in a low spatial resolution mode, while other regions 102 are read out less often at a high spatial resolution mode. One application of this capability is to identify the regions 102 that lie within the patient being imaged and those regions that are background. The background regions 102 are scanned in a low resolution mode and the patient regions 102 are scanned at a higher resolution. This provides a number of benefits. The patient regions 102 are read at a slower rate which allows more time for the charges to accumulate on each detector element therein. This enables a higher SNR to be achieved in the clinically important regions of the image. On the other hand, the background regions 102 are read at a higher rate which prevents the charges on their detector elements from saturating the detectors and pre-amplifiers. Furthermore, since the low resolution background data is obtained at a higher rate, much of this data may be ignored, or dumped. This significantly reduces the processing burden on the x-ray system and enables an overall increase in time resolution for processor-bound systems.

Another aspect of the present invention is the ability to measure the x-ray exposure from different regions of the image. The resolution of the measurement may range from that of a single detector element to that of an entire region 102. A prescan measures the exposure at different locations, and based on these measurements, the best spatial/contrast resolution for each of the regions 102 can be determined and used to program the scan sequencer 110. Such a prescan of the patient can be used to identify the clinical region of interest (such as a particular organ) and the resolution/contrast can be optimized for the corresponding regions 102. The programmed scan sequencer 110 then performs an image scan of the detector array 100 which is optimized to provide high resolution, high SNR images in the region of clinical interest.

Yet another aspect of the present invention is the ability to reduce the cost of the imaging system. By configuring certain regions for high resolution imaging and other regions for low resolution imaging, available electronic hardware is more efficiently used. This enables less electronic hardware to be used for a given set of image quality specifications. In addition, the acquisition of excess data from regions such as the background may be reduced with a corresponding reduction in image reconstruction hardware and processing capability.

DESCRIPTION OF THE PREFERRED EMBODIMENT

Figure 4:
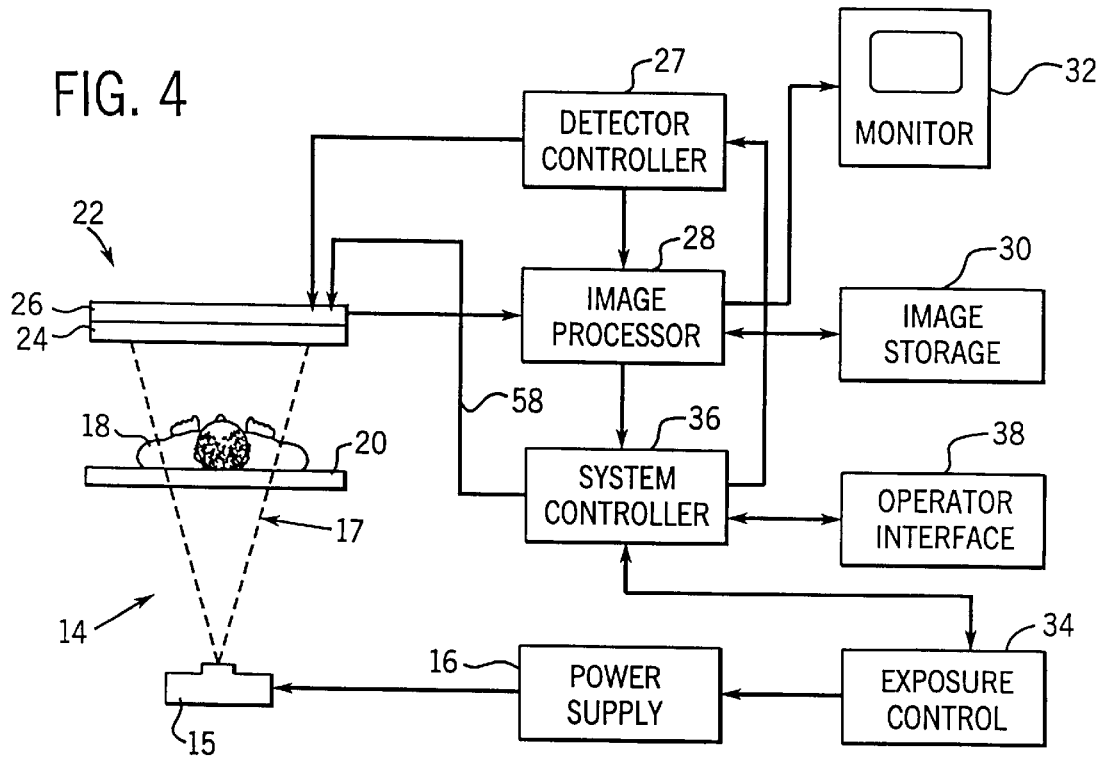
FIG. 4 is a block diagram of a preferred embodiment of an x-ray imaging system which employs the present invention.

With initial reference to FIG. 4, an x-ray apparatus 14 includes an x-ray tube 15 which, when excited by a power supply 16, emits an x-ray beam 17. As illustrated, the x-ray beam is directed toward a patient 18 lying on an x-ray transmissive table 20. The portion of the beam which is transmitted through the table and the patient impinges upon an x-ray detector assembly 22. The x-ray detector assembly 22 comprises a scintillator 24 that converts the x-ray photons to lower energy photons in the visible spectrum. Contiguous with the scintillator 24 is an image photodetector array 26, which converts the light photons into an electrical signal. As will be explained in more detail below, a detector controller 27 contains electronics for operating the detector array 26 to acquire an image and to read out the signal from each photodetector element.

The output signal from the image photodetector array 26 is coupled to an image processor 28 that includes circuitry for collecting, processing and enhancing the x-ray image signal. The processed image is displayed on a video monitor 32 and may be stored in an image storage device 30. The overall operation of the x-ray apparatus 14 is governed by a system controller 36 which receives commands from the user via an operator interface panel 38.

Figure 3:
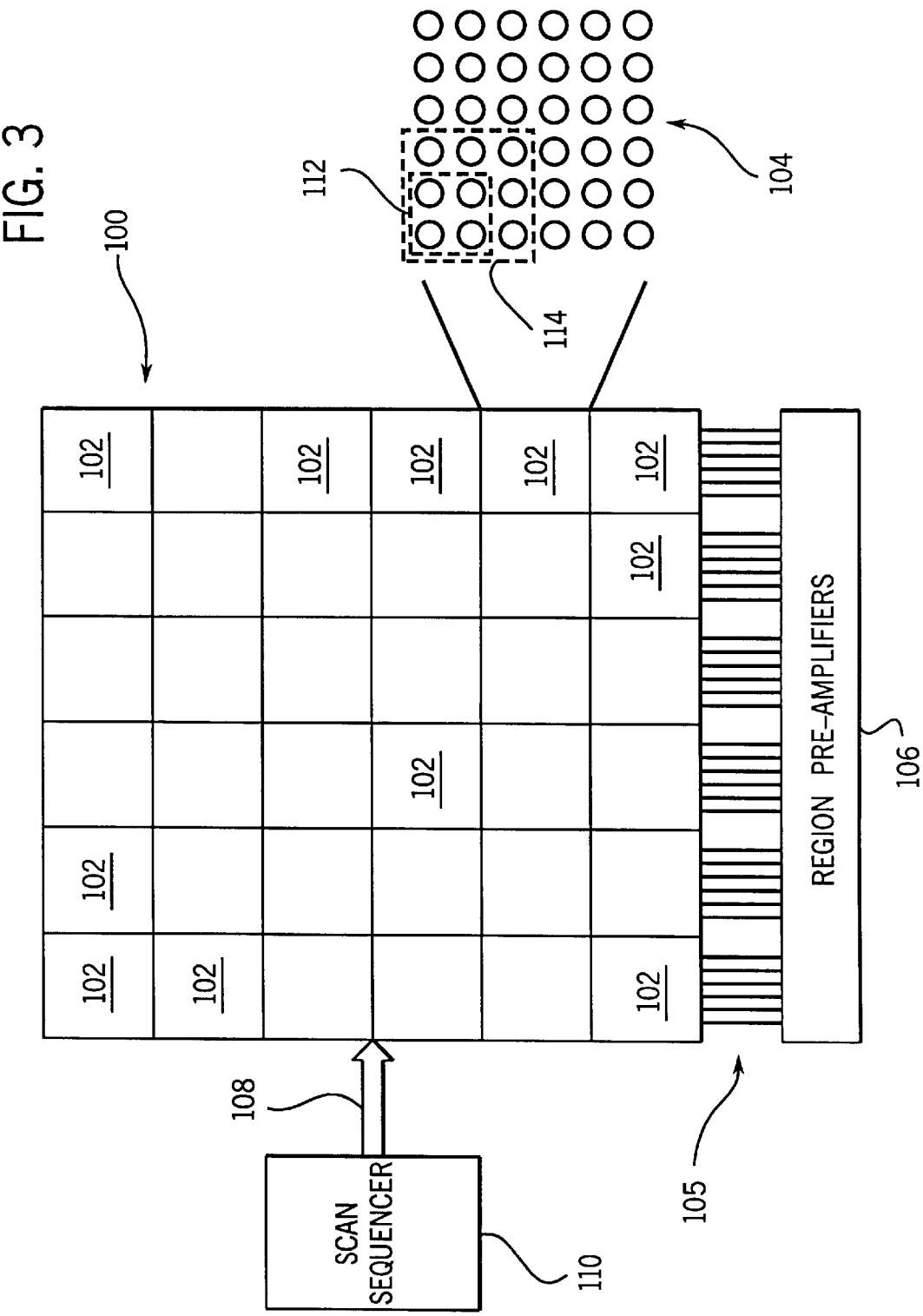
FIG. 3 is a pictorial representation of the regions scanned by the x-ray detector of the present invention.

The image photodetector array 26 consists of amorphous silicon devices on a glass substrate. It is constructed using well known techniques such as those disclosed in U.S. Pat. Nos. 5,041,888; 5,352,884 and 5,401,668. To implement the present invention the separate detector elements are not interconnected in the row and column configurations as is done in prior systems. Instead, the detector elements are interconnected to form regions 102 as shown in FIG. 3. In the preferred embodiment the photodetector array 26 has 2048 by 2048 detector elements which are segmented into 4096 regions 102. Each region 102 has 32 by 32 detector elements which connect to a single region pre-amplifier 106. Each detector element has a size of 200 by 200 microns.

Figure 5:
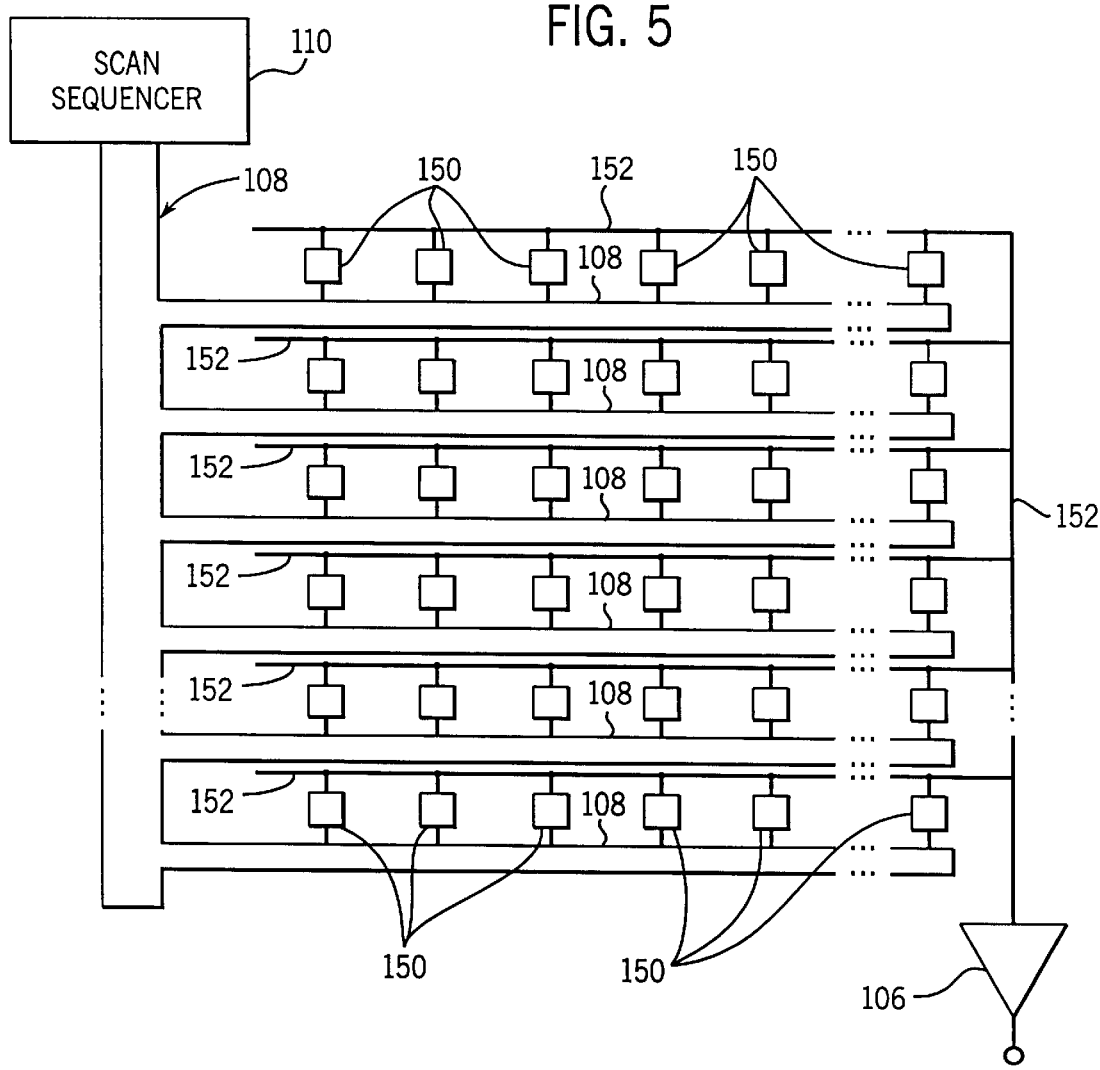
FIG. 5 is an electrical schematic diagram of a preferred embodiment of a region of an x-ray detector which employs the present invention.

Referring particularly to FIG. 5 which schematically illustrates one of the regions 102, the detector elements 150 are physically arranged in an array of columns and rows. A data line 152 connects to each detector element 150 in the region 102 and couples the data signals therefrom to the input of a region pre-amplifier 106. The pre-amplifier 106 amplifies the data signals to a level suitable for application to an analog-to-digital converter (not shown in the drawings).

The detector elements 150 in each region 102 are each also connected to a separate control line in control line bus 108. The control lines 108 are driven by a scan sequencer 110 which is programmed to gate the signals from the detector elements 150 in a pattern determined by the specified scan being conducted. The gated detector element signal is conveyed through the data line 152 to the region pre-amplifier 106. As will be described in more detail below, a block of detector elements 150 can be gated simultaneously, in which case, their signals combine on the data line 152.

The remaining regions 102 in the detector array 26 are connected in identical fashion to the control line bus 108. However, each region 102 has its own preamplifier 106. Consequently, corresponding detector elements 150 in each of the regions 102 are gated at the same moment by the scan sequencer 110, but their signals are captured by separate, corresponding region pre-amplifiers 106.

It can be appreciated that additional scan sequencer circuitry can be added to readout selected regions 102 in the detector array 26 at differing rates. For example, the detector array 26 can be configured to assign more than one scan sequencer to read out selected regions 102. For example, two scan sequencers 110 assigned to different regions 102 are selectively connected to field effect transistor switches (not shown in the drawings) and the scan sequencer 110 then reads out the signal from a first set of detector element, or elements, to the preamplifier 106 at one rate and also reads out the signal from another set of detector element, or elements to the preamplifier 106 at an entirely different rate. Other circuit arrangements are also possible to configure particular scan sequencers and regions 102 differently.

The scan sequencer 110 can be programmed to carry out a wide variety of different scans, or read outs, of the detector array 26. In a high resolution scan, for example, the scan sequencer 110 is programmed to sequentially gate each detector element 150, one at a time. Each detector element 150 thus provides a signal for a separate pixel in a reconstructed image having a resolution corresponding to the spacing between detector elements 150.

Lower resolution images may be produced by programming the scan sequencer 110 to read out blocks of detector element signals. For example, blocks of four detector elements 150 may be read out onto the data line 152 to reduce the image resolution by one-half. However, only one-fourth the number of read out operations are required to do this, and as a result, the scan rate can be increased up to four times as fast. Larger blocks of detector elements 150 can also be read out to further reduce resolution and increase scan rate. In some applications it may even be advisable to read out all the detector elements 150 in the region 102 as a single block. For example, large blocks of detectors 150 may be read out during a calibration scan to operate an exposure control 34 or a variable exposure control across the entire image plane and to thereby adjust the x-ray tube dose rate.

It should be apparent that the present invention may be implemented in many different ways and used in many different clinical applications. It is particularly useful in clinical applications where the clinical region of interest occupies a relatively small portion of the entire image field of view. Such applications include, for example, pediatric images, organ and limb images, head images, and heart and tumor images.

What is claimed is:

1. An x-ray detector, comprising:
   a plurality of detector elements arranged in a two-dimensional array of columns and rows and being segmented into a plurality of regions, each region containing a group of detector elements in a plurality of rows and a plurality of columns;
   a plurality of data lines corresponding to the plurality of regions, each data line being connected to each of the detector elements in its corresponding region;
   a control line bus having a plurality of control lines corresponding to the plurality of detector elements in a region, each control line being connected to its corresponding detector element in each of the plurality of regions; and
   a scan sequencer connected to the control line bus and being operable during a scan to sequentially produce gating signals on the control lines which read out data signals from the detector elements, the scan sequencer being operable to produce gating signals which read out data signals from the different regions such that an image having different spatial resolutions at different regions of the image may be produced.

2. The x-ray detector as recited in claim 1 in which a plurality of pre-amplifiers are connected to the respective data lines, each preamplifier being operable to receive and amplify the data signal from its respective data line during the scan.

3. The x-ray detector as recited in claim 2 in which a plurality of preamplifiers are selectably connected to the data line in selected ones of the plurality of regions.

4. The x-ray detector as recited in claim 1 in which each of the regions includes a rectangular shaped group of detector elements.

5. The x-ray detector as recited in claim 4 in which the regions are substantially the same shape and size.

6. The x-ray detector as recited in claim 1 in which the scan sequencer is operable to produce gating signals which sequentially read out data signals from each individual detector element in one of the regions during the scan, and the scan sequencer is operable to produce gating signals which sequentially read out data signals from blocks of detector elements in another one of the regions during the scan.

7. The x-ray detector as recited in claim 6 in which each block of detector elements is a rectangular array of detector elements located in a plurality of rows and a plurality of columns in the two-dimensional array of detector elements, and the data signals from the detector elements in each block are combined on the corresponding region data line.

8. The x-ray detector as recited in claim 7 in which each block contains a square array of detector elements.

9. The x-ray detector as recited in claim 1 in which the scan sequencer is operable to produce gating signals which read out data signals from the different regions such that the data signals are read out of detector elements in one of the regions at a different rate during the scan than the data signals read out of detector elements in another of the regions.

10. The method as recited in claim 9 which includes producing an image from the data signals which has different spatial resolution at different regions thereof.

11. The method as recited in claim 10 in which the gating signals produced in steps c) and d) are each produced for a plurality of regions.

12. The method as recited in claim 10 which includes producing an image from the data signals which has different spatial resolution at different regions thereof.

13. The method as recited in claim 12 which includes:
    reconstructing an image from the data signals read out of the two-dimensional array of detector elements.

14. The method as recited in claim 13 which includes:
    performing a prescan using the two-dimensional array of detector elements to produce an image from which a clinical region of interest is identified; and
    selecting said one region to correspond in spatial location with the identified clinical regions of interest.

15. The method as recited in claim 14 which includes setting the first spatial resolution of said one region greater than the second spatial resolution.

16. The method as recited in claim 15 in which a plurality of regions corresponding in spatial location with the identified clinical region of interest are set to said first spatial resolution.

* * * * *

UNITED STATES PATENT AND TRADEMARK OFFICE
CERTIFICATE OF CORRECTION

PATENT NO.    : 6,437,338 B1
DATED         : August 20, 2002
INVENTOR(S)   : David M. Hoffman It is certified that error appears in the above-identified patent and that said Letters Patent is hereby corrected as shown below:

<u>Column 6,</u>
Line 36, claim 10 reading:
"10. The method as recited in claim 9 which includes producing an image from the data signals which has different spatial resolutions at different regions thereof.", should read:

10. A method for scanning a two-dimensional array of detector elements, the steps comprising:

a) segmenting the two-dimensional array into a plurality of regions, each region having a two-dimensional subarray of detector elements;

b) coupling data signals read out of detector elements in each of the regions to a corresponding region amplifier;

c) producing gating signals for the detector elements in a selected one of the regions to read out data signals at a first spatial resolution to its region amplifier; and d) producing gating signals for the detector elements in another selected region to read out data signals at a second spatial resolution to its region amplifier.

Signed and Sealed this

Eighth Day of April, 2003

JAMES E. ROGAN
*Director of the United States Patent and Trademark Office*